Jan. 15, 1963 D. L. HAVILAND 3,073,214
NEGATIVE HOLDERS
Filed March 6, 1959 4 Sheets-Sheet 1

INVENTOR
DOUGLAS L. HAVILAND
*Caswell & Lagaard*
ATTORNEYS

Jan. 15, 1963

D. L. HAVILAND 3,073,214

NEGATIVE HOLDERS

Filed March 6, 1959

INVENTOR
DOUGLAS L. HAVILAND

*Caswell & Lagaard*

ATTORNEYS

Jan. 15, 1963    D. L. HAVILAND    3,073,214
NEGATIVE HOLDERS

Filed March 6, 1959    4 Sheets-Sheet 3

INVENTOR
DOUGLAS L. HAVILAND

*Caswell & Lagaard*

ATTORNEYS

Jan. 15, 1963   D. L. HAVILAND   3,073,214
NEGATIVE HOLDERS
Filed March 6, 1959   4 Sheets-Sheet 4

INVENTOR
DOUGLAS L. HAVILAND

Caswell & Lagaard
ATTORNEYS

United States Patent Office 3,073,214
Patented Jan. 15, 1963

3,073,214
NEGATIVE HOLDERS
Douglas L. Haviland, Minneapolis, Minn., assignor to Pako Corporation, Minneapolis, Minn., a corporation of Delaware
Filed Mar. 6, 1959, Ser. No. 797,785
13 Claims. (Cl. 88—24)

The herein disclosed invention relates to photographic printing apparatus in which the light source is fixed relative to the supporting structure and the optical section and paper section are movable relative thereto to vary the size of the print, and has for an object to provide a negative holder for use therewith which is easily and quickly manipulated and which securely holds the negative flat and in proper printing position.

Another object of the invention resides in providing a negative holder which can be easily and quickly altered to accept negatives of various sizes.

A still further object of the invention resides in providing a negative holder which can be operated by the knee of the user leaving both hands free to handle and position the negative.

An object of the invention resides in providing a negative holder in which the holder may be placed in wide open position to permit of interchanging negative masks and for insertion of curled negatives or negatives not relatively flat and in which the holder may be allowed to partially close to permit of adjusting the negative to the desired printing position and in which the negative is securely clamped in position during the printing period.

Another object of the invention resides in providing a negative holder in which the final clamping operation is controlled electrically.

An object of the invention resides in providing the holder with a top having an opening therein of a size somewhat greater than the width of the widest negative to be printed and a length somewhat greater than the length of the longest negative to be printed, said opening being encompassed by a rabbeted recess and inserting in said recess a masking plate having an opening corresponding in size with the size of the area of the negative to be printed.

An object of the invention resides in constructing said opening square so that the mask may be placed in either of two positions in the opening and the films may be run laterally or longitudinally with reference to the negative holder and in further supporting the frame from a locality adjacent one corner thereof and outwardly of said opening to further accommodate such handling of the negative.

Another object of the invention resides in providing a negative holder having a U-shaped frame pivoted along a horizontal axis at the connecting portion of the frame and in providing grooves in the spaced legs of the frame for the reception of a clamping plate having an opening therein corresponding with the opening in said masking plate and adapted to engage the film and hold it in printing position.

A still further object of the invention resides in providing the clamping plate with a downwardly extending offset at the marginal portion of the opening therein extending below the legs of said frame.

A specific object of the invention resides in the mechanism for manually moving the frame and clamp plate into wide open position.

Another specific object of the invention resides in the construction causing final clamping of the negative.

Other objects of the invention reside in the novel combination nad arrangement of parts and in the details of construction hereinafter illustrated and/or described.

For the purpose of illustration of the invention, the film holder disclosed herein has been shown as applied to a photographic printer such as disclosed in the application for patent of Roy A. Clapp, Serial Number 790,226, filed January 30, 1959.

The printer shown therein is mounted on a table A which supports the various sections of the same. Extending upwardly from said table at one end thereof is a column B which supports a paper section C and an optical section F. These two sections are movable in an up and down direction to focus the image on the paper. Mounted on the table at the intermediate portion of the same is an illuminating section D by means of which light may be passed through a negative carried by a negative holder E disposed at the upper surface of the table A and which constitutes the instant invention. Only so much of the printer proper as is needed to explain the instant invention will be described, the description of the remaining portions of the printing apparatus being disclosed in said application for patent and will not be repeated.

*The Table*

Table A, best shown in FIGS. 1, 2, 3 and 7, consists of a table top 30 which is constructed of sheet metal and which has depending flanges 31 at the marginal portions of the same. Lips 32 extend inwardly from the lower edges of the flanges 31 and form a box-like structure for the top. The top 30 rests upon two standards 33 and 34 spaced from one another to form a knee spaced 35 therebetween. Various parts of the printer forming no feature of the instant invention are contained within said standard.

*The Column*

Figure 1:
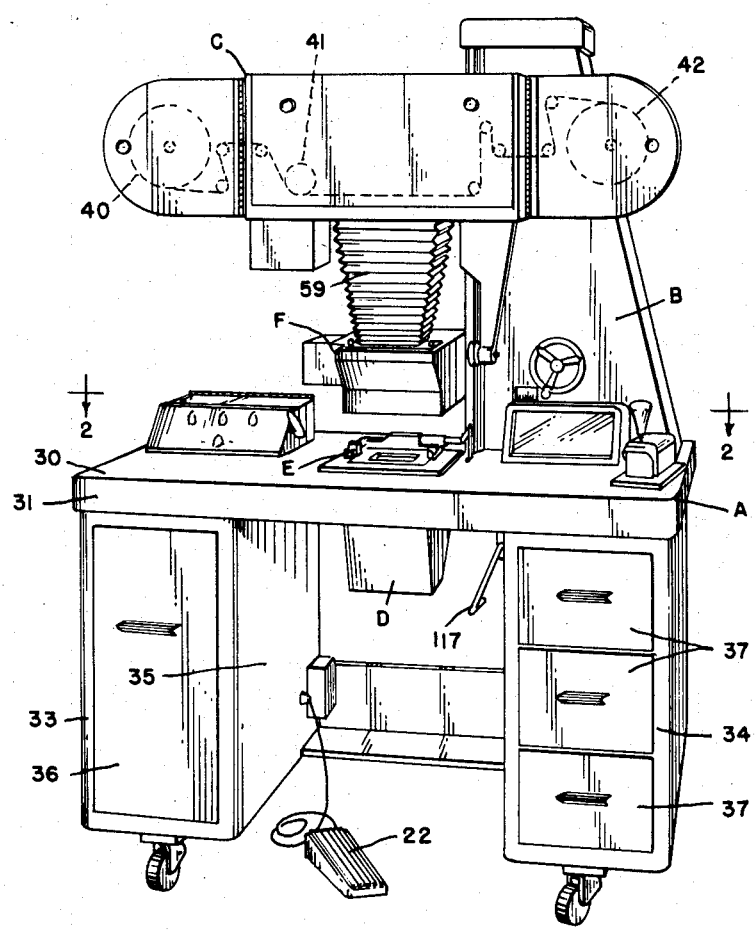
FIG. 1 is a perspective view of a photographic printer illustrating an embodiment of the invention.
Figure 2:
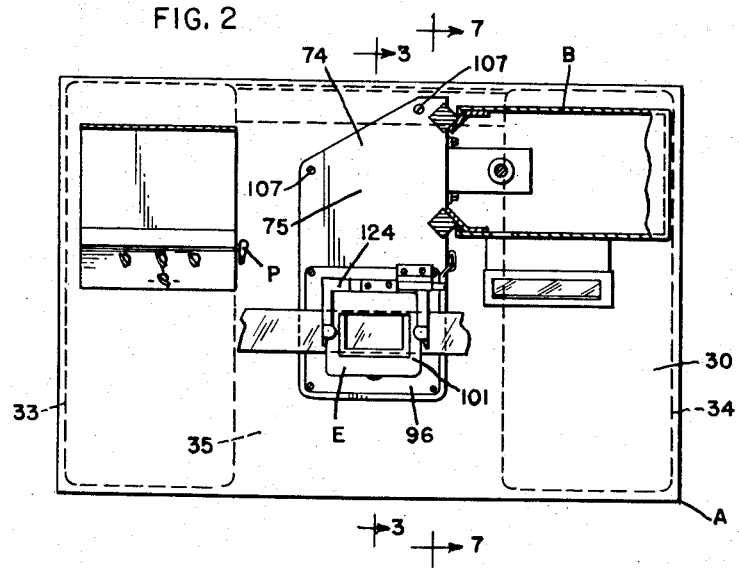
FIG. 2 is a plan sectional view taken on line 2—2 of FIG. 1.

Column B, shown in FIGS. 1 and 2, may be of any desired construction and supports the paper section C and the optical section F for relative movement with respect to each other and with respect to the film holder E. Suitable mechanism is employed whereby these parts may be adjusted to vary the size of the print and to focus the image from the negative on the paper. Such construction forming no feature of the instant invention, has not been shown in detail and will not be described. It will readily be apparent, however, that the invention may be used in any type of focusing and elevating mechanism now in common use.

*The Paper Section*

The paper section C of the invention, shown only in FIG. 1, contains a magazine 40 for storing unprinted paper in the roll, a feed mechanism 41 which directs the paper in position to receive the image transmitted to it by the optical system, and a take-up mechanism 42 which rolls up the printed paper and stores the same for subsequent development. Again, this particular construction forms no feature of the instant invention and has not been illustrated in detail nor will it be further described. However, any paper feeding mechanism such as is now well known in the art may be used for the purpose.

The Illuminating Section

Figure 3:
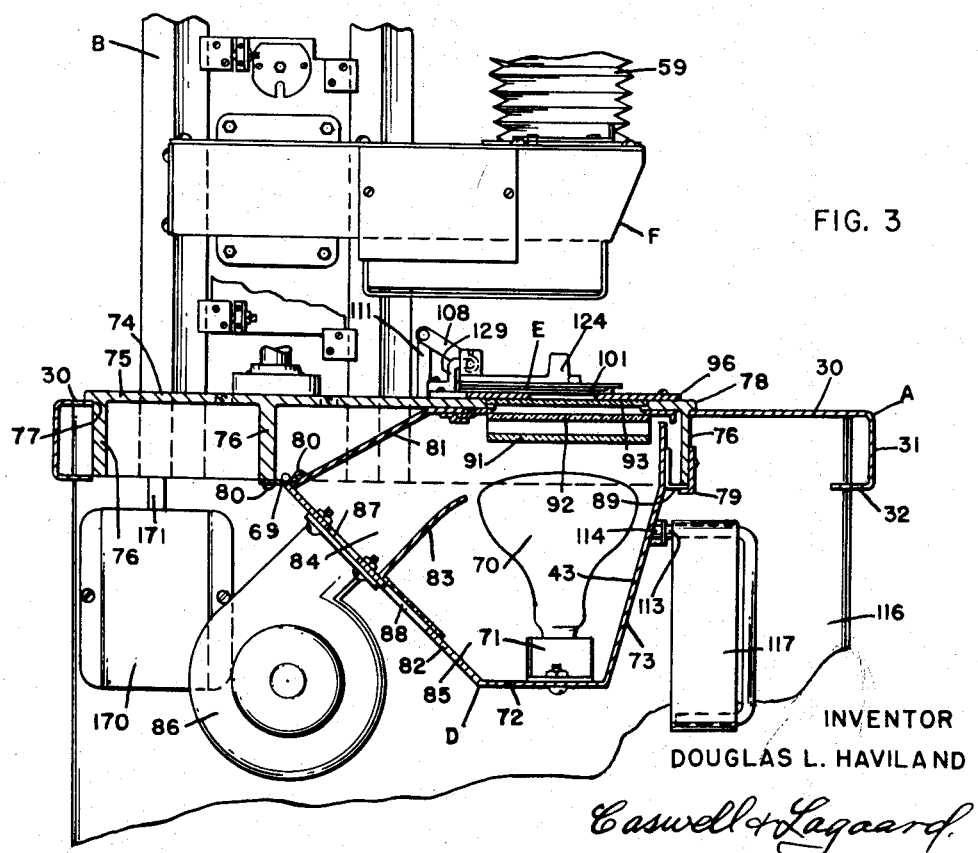
FIG. 3 is a fragmentary elevational sectional view taken on line 3—3 of FIG. 2 and drawn to a greater scale.
Figure 5:
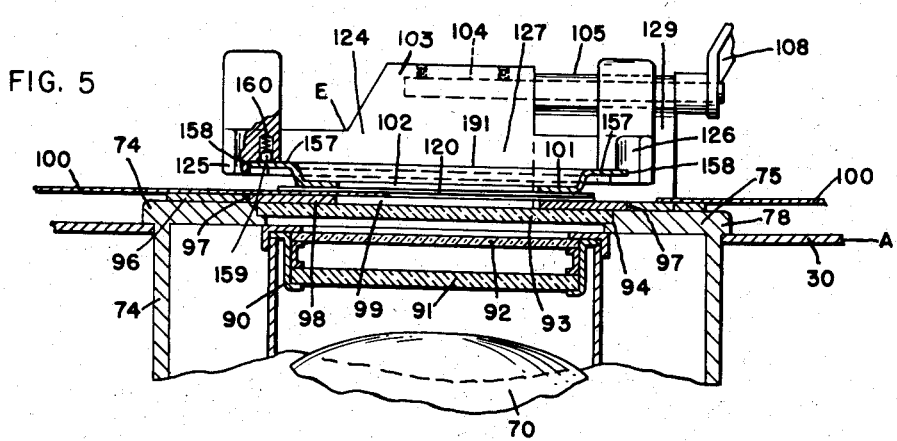
FIG. 5 is a fragmentary elevational sectional view taken on line 5—5 of FIG. 4.

Light is procured for the purpose of printing from a lamp 70 forming part of the illuminating section D, best shown in FIGS. 3 and 5. This lamp is mounted in a socket 71 which is attached to the bottom 72 of a case 73. The case 73 is attached to an insert 74 constructed in the form of a casting. This insert has a top 75 and flanges 76 depending therefrom. The insert 74 extends through an opening 77 in the table top 30 and the marginal portion 78 of the top 75 rests on the table top 30 and supports the insert 74. The case 73 is attached to the flanges 76 by means of a hinge 69 which is secured to said case and to said flanges through screws 80. The front of the case 73 has a front wall 43 and to which is secured a latch lug 89. A latch 79 pivoted to the flange 76 of insert 74 engages said lug and holds the case in position. The case 73 has an upper wall 81 extending up to the top 75 and a rear wall 82 extending angularly from the bottom 72. In the interior of the case 73 is provided a baffle 83 which extends partially into said case and divides the same into two compartments 84 and 85. A motor driven blower 86 is attached to the rear wall 82 and directs air through an opening 87 in said wall and into the compartment 84. Air entering this compartment flows upwardly and about the lamp 70 and leaves the compartment 85 through a screened opening 88 in the wall 82 immediately below the baffle 83. By means of this construction, the lamp 70 may be operated for an extended period at full brilliancy and kept sufficiently cool.

Within the case 73 and above the lamp 70 is mounted a filter holder 90 which is attached to the upper portion of case 73 below the top 75 of insert 74. A heat absorbing filter 91 is mounted in the lower portion of this holder and is next to the lamp 70. Above this filter is disposed a light equalizing plate 92 and above this plate is disposed a light diffusing plate 93. The top 75 has a rabbeted opening 94 formed in the same and in which is received the plate 93.

The Negative Holder

Figure 4:
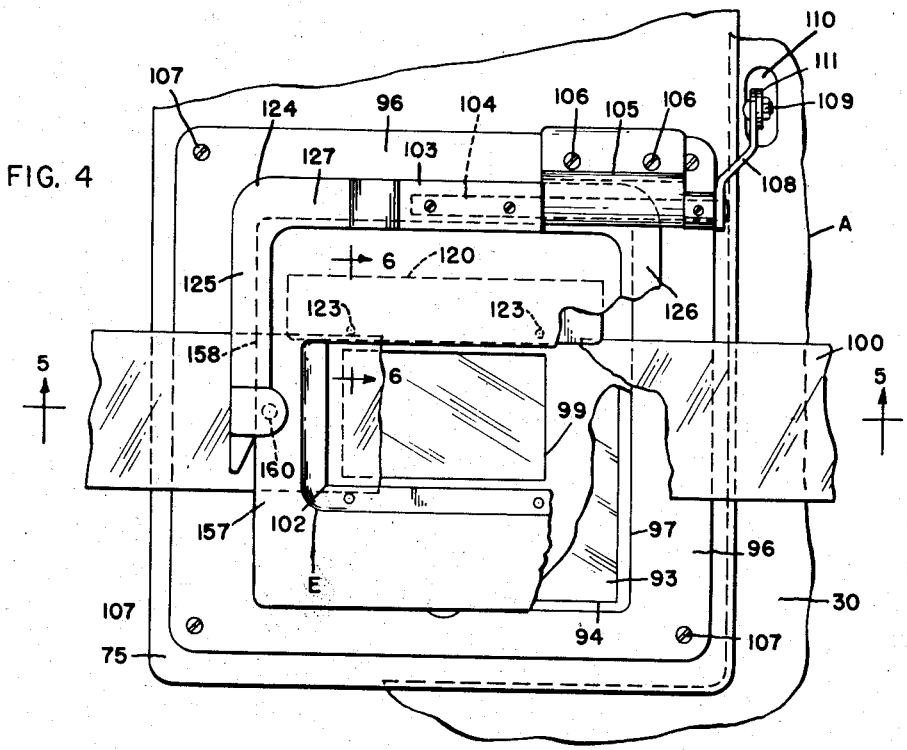
FIG. 4 is a plan view of the portion of the structure shown in FIG. 2 and incorporating the negative holder, said figure being drawn to a greater scale than FIG. 2.

Above the plate 93 and attached to the top 75 is the negative or film holder E which forms the subject matter of the instant invention and which is shown in detail in FIGS. 4 and 5. This negative holder consists of a frame 96 formed with a square aperture 97 to receive a square printing mask 98. This frame is secured to the top 75 by means of screws 107, FIG. 4. The mask 98 has an opening 99 in the same and through which the light emerges. The negative, one of which is indicated by the reference numeral 100 in the drawings, rests upon the mask 98 and upon the frame 96. For holding the negative in position upon said mask, a square clamp plate 101 is employed which has an opening 102 through the same of dimensions substantially equal to the opening 99 in the mask 98 and superimposing the same. For supporting said clamp plate, a U-shaped frame 124 is employed which has spaced legs 125 and 126 with a connecting portion 127 therebetween. This frame overlies the mask 98 and straddles the opening 99 in the same. The marginal portion 157 of the plate 101 which is offset upwardly from the central portion of the plate, is adapted to be inserted into slots 158 in the legs 125 and 126 and in the connecting portion 127 of frame 124. Spring pressed balls 159 slidably movable in bores 160 in the legs 125 and 126 hold the plates 101 detachably mounted in the frame 124.

The connecting portion 127 has a lug 103 extending upwardly from the same and which has attached to it a stub shaft 104. Shaft 104 is journaled in a bearing 105 formed on a post 129 secured to the frame 96 by means of screws 106. This bearing is disposed rearwardly of the opening 99 for the maximum width negative and to the right of the same and frame 124, when in fully open or partly open position, is spaced from mask 98 to allow the negative to be run either transversely or longitudinally through the printer. The mask 98 and the clamp plate 101 may accordingly be placed in different positions in the aperture 97 and slots 158 to permit of running the negative either transversely or longitudinally through the printer.

Figure 8:
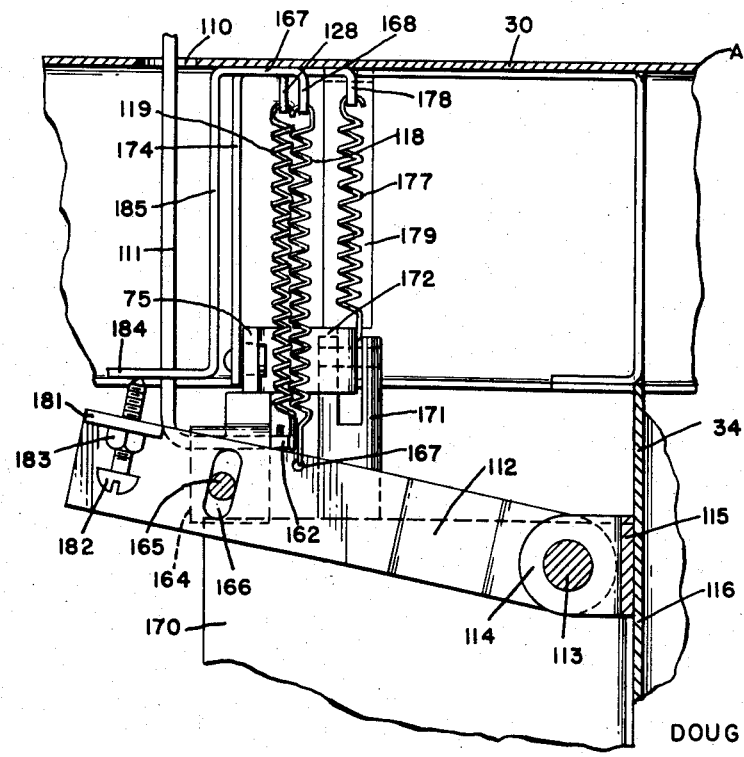
FIG. 8 is a fragmentary elevational sectional view taken on line 8—8 of FIG. 7 and drawn to a still greater scale.

The frame 124 is moved in an up and down direction by means of the following construction: An arm 108 is secured to the end of the stub shaft 104 and extends rearwardly thereof. This arm has pivoted to it by means of a bolt 109, a link 111, which extends through a slot 110 in the table top 30, FIGS. 4 and 8. Link 111 is in turn pivoted to an arm 112 extending outwardly from a shaft 113. This shaft is rotatably mounted in lugs 114 which project outwardly from a bracket 115. Bracket 115 is secured to the inner wall 116 of standard 34. Connection between the link 111 and arm 112 is effected in the following manner: Link 111 has an outwardly bent flange 162 and to which is welded a plate 163. This plate has a depending flange 164 which has attached to it a headed pin 165. Pin 165 passes through a transverse slot 166 in the lever 112. A tension coil spring 118 is attached at one end to the arm 112 and at its other end to a lug 168 formed on a bracket 167 secured to the underside of the table top 30. This spring urges arm 112 upwardly. The shaft 113 has a lever 117 depending therefrom and which extends into the knee space 35 of table A. Another spring 119 is connected at one end to the flange 162 of link 111 and is anchored at its other end to a lug 128 on the underside of the table top 30. The spring 119 serves to urge the clamp plate 101 toward film clamping position. When the operator's knee is moved laterally against the lever 117, the film holder is raised and the film can be moved and adjusted as desired. When the lever 117 is released, the film is held in a position parallel to but spaced from the mask 98 to permit sliding of the film along the same.

Figure 7:
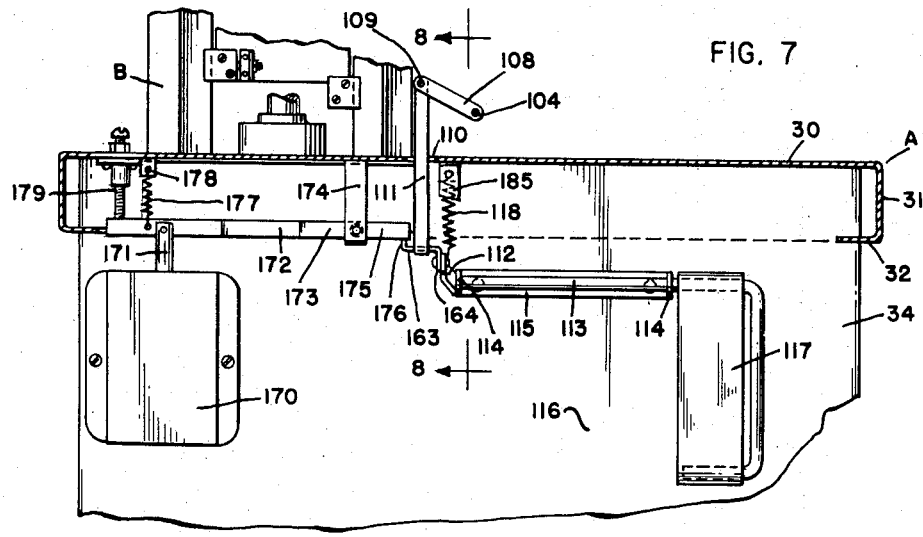
FIG. 7 is a transverse elevational sectional view taken on line 7—7 of FIG. 2 and drawn to the same scale as FIG. 3.

Final clamping of the film in position is procured by means of a solenoid 170, FIG. 7, which has a core 171 adapted to be drawn into the solenoid proper when the solenoid is energized. This core has pivoted to it one arm 172 of a lever 173. Lever 173 is pivoted to a hanger 174 attached to and depending from the underside of the top 30 of table A. The other arm 175 of the lever 173 overlies and engages a lug 176 on the plate 163. A tension coil spring 177 is connected to the arm 172 of lever 173 and to a lug 178 attached to the underside of table top 30. This spring moves in a direction to urge the core 171 out of the solenoid proper and to hold the link 111 in a position in which the clamp plate 101 is spaced from the mask 98. An adjustable stop 179 limits the movement of lever 173.

The end of arm 112 has a lug 181 extending outwardly therefrom. This lug is tapped to receive an adjusting screw 182. A lock nut 183 screwed on said screw and engaging lug 181 holds the screw in adjusted position. Screw 182 engages a stop 184 formed on a hanger 185 depending from the bracket 167 and limits movement of the arm 112 to a position in which pin 165 can move in slot 166 free from said arm to effect final clamping of the film by the solenoid 170.

Figure 6:
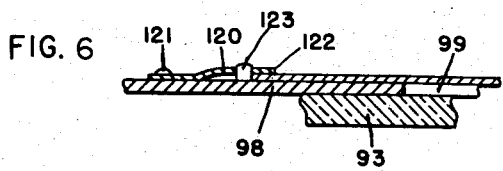
FIG. 6 is a fragmentary elevational sectional detail view taken on line 6—6 of FIG. 5.

The film is guided for movement over the mask 98 by means of a resilient clamp 120, FIG. 6. This clamp is attached to the mask 98 by means of rivets 121 and the marginal portion 122 of the same engages the mask proper. A number of stops 123 are attached to the mask 98 and project through the clamp 120. The resiliency of the clamp 120 permits of inserting the film between said clamp and mask and yieldingly holds it in position against the stops 123 which center the same over the printing opening 99.

The Optical Section

The optical section F of the disclosure may consist of any suitable lens system suitable for focusing the image from the negative on the printing paper when the paper section and the optical section are moved relative to one another in proper relationship. The invention has been shown as applied to the printer forming the subject matter of the previously mentioned application for patent for the sake of convenience.

Operation of the Invention

In its normal position the supporting frame 124 is in partially closed position, a distance above the top 74 sufficient to separate the mask 98 from the clamp plate 101 to allow a film to pass therebetween without scratching. When it is desired to use the device, the lever 117 is moved toward the standard 34 which rotates shaft 113 and arm 112 secured thereto. When pin 165 reaches the end of slot 166, link 111 is carried downwardly with it and shaft 104 is rotated by means of arm 108 which is pivoted to said link. This swings frame 124 in an upward direction making the holder wide open and giving free access to the space between said frame and the frame 96. During such movement of frame 124, lug 176 on plate 163 which is carried by link 111, moves downwardly and away from the arm 175 of lever 173. In this position the proper printing mask 98 is inserted in the aperture 97 and in which position it rests on the top 75 with its upper surface flush with the upper surface of said frame. The corresponding clamp plate 101 is next mounted in the frame 124 by sliding the lateral marginal portions along the slots 158 and until the clamp plate reaches its innermost position. In such position, the clamp plate 101 is forced against the lower portion of frame 124 formed by the slots 158 by means of the spring pressed balls 159. A negative may then be inserted into the holder and beneath the clamp 120 and against the stops 123. Lever 117 is now released permitting spring 119 to draw the link 111 upwardly until lug 176 engages arm 175 of lever 173. Thus frame 124 is lowered by spring 119 until the clamp plate 101 reaches an intermediate position in which the film 100 may be passed beneath the same without scratching. It will be noted that at such position pin 165 is intermediate the ends of the slot 166 so that clamp plate 101 is free to assume such position. While the parts are so disposed, the film may be moved about and adjusted to its printing position. Upon operating foot switch 22, a printing cycle is started, and as soon as printing is about to commence the solenoid 170 is energized. This draws lever 173 downwardly which raises the arm 175 upwardly and correspondingly the link 111. Arm 108 is hence raised upwardly by means of spring 119 and frame 124 forced downwardly to urge clamp plate 101 against the negative 100. During the final clamping movement, pin 165 travels in slot 166, arm 112 remaining stationary.

The advantages of the invention are manifest. The operator has both hands free to manipulate the negative while raising the clamp plate by means of the knee operated lever. When the knee operated lever is released the frame 124 is again held in position by means of the spring 119 and in which position the negative may be readily adjusted. When printing commences, the negative is securely clamped in position by means of the solenoid and so held until printing is completed. The movement of the clamping plate is positive in action and when the final clamping takes place the negative is firmly held in position. The intermediate position of the clamp plate is automatically determined by the lever 173 and stop 179. The negatives can be fed through the printer either transversely thereof or longitudinally thereof by proper insertion of mask 98 in aperture 97 and clamp plate 101 in slots 158.

Changes in the specific form of the invention as herein described, may be made within the scope of what is claimed without departing from the spirit of the invention.

Having described the invention, what is claimed as new and desired to be protected by Letters Patent is:

1. A negative holder comprising a support having a substantially horizontal top formed with an opening therein through which printing light may pass, means carried by said top and providing a square recess registering with the opening in said support, a square mask received in said recess and having an oblong opening corresponding with the portion of the negative to be printed, a frame having spaced legs and a connecting portion therebetween overlying said support in spaced relation thereto and straddling the opening in said mask, a single upright carried by the support and disposed outwardly of the opening in the mask and solely within the reentrant angle formed by the projections of two of the intersecting edges of the opening, thereby providing a clear path from front to back and from side to side over which a strip of film the width of said recess may be moved either laterally or longitudinally, a substantially horizontal bearing on said upright disposed above the film, a shaft journaled in said bearing and secured to said frame at a locality above the film and supporting said frame for swinging movement toward and from said top, and clamping means carried by the legs of said frame and engageable with the film to hold the same in printing position.

2. A negative holder comprising a support having a substantially horizontal top formed with an opening therein through which printing light may pass, means carried by said top and providing a square recess registering with the opening in said support, a square mask received in said recess and having an oblong opening corresponding with the portion of the negative to be printed a frame having spaced legs and a connecting portion therebetween overlying said support in spaced relation thereto and straddling the opening in said mask, a single upright carried by the support and disposed outwardly of the opening in the mask and within the reentrant angle formed by the projections of two of the intersecting edges of the opening, thereby providing a clear path from front to back and from side to side over which a strip of film the width of said recess may be moved either laterally or longitudinally, pivot means between said frame and upright and disposed above the film, said pivot means supporting said frame for swinging movement toward and from said top, and clamping means carried by the legs of said frame and engageable with the film to hold the same in printing position.

3. A negative holder comprising a support having a substantially horizontal top formed with an opening therein through which printing light may pass, means carried by said top and providing a square recess registering with the opening in said support, a square mask received in said recess and having an oblong opening corresponding with the portion of the negative to be printed, frame having spaced legs and a connecting portion therebetween overlying said support in spaced relation thereto and straddling the opening in said mask, an upright carried by the support and disposed solely in the reentrant angle between the extensions of two of the adjacent sides of the opening in said mask, and providing a clear path from front to back and from side to side over which a strip of film may be moved either laterally or longitudinally, pivot means between said frame and upright and disposed above the film, said pivot means supporting said frame for swinging movement toward and from said top, and clamping means carried by the legs of said frame and engageable with the film to hold the same in printing position.

4. A negative holder comprising supporting means having a surface on which a negative may be placed and having an opening therein through which printing light may pass through the negative supported thereon, a frame overlying said supporting means and having clamp means for engagement with the film to urge it against said surface of the supporting means, pivot means between said supporting means and frame and guiding said frame for movement toward and from said surface, pressure means yielding urging said frame toward said supporting means to effect clamping of a film lying on said surface, an arm movable with said frame, movable stop means engageable with a part movable with said arm and restraining movement of said frame and holding said frame with said clamp means closely positioned to said surface but spaced therefrom to loosely hold the negative therebetween, manually controlled means engageable with said arm for moving said part movable with the arm away from the stop means and said frame away from said surface, and means for rendering said stop means inoperable to free said part and cause said pressure means to urge said frame and clamp into clamping position.

5. A negative holder comprising supporting means having a surface on which a negative may be placed and having an opening therein through which printing light may pass through the negative supported thereon, a frame overlying said supporting means and having clamp means for engagement with the film to urge it against said surface of the supporting means, pivot means between said supporting means and frame and guiding said frame for movement toward and from said surface, pressure means yieldingly urging said frame toward said supporting means to effect clamping of a film lying on said surface, an arm movable with said frame, movable stop means engageable with a part movable with said arm and restraining movement of said frame and holding said frame with said clamp means closely positioned to said surface but spaced therefrom to loosely hold the negative therebetween, manually controlled means engageable with said arm for moving said part movable with the arm away from the stop means and said frame away from said surface, and a solenoid having an armature connected to said stop means and moving said stop means away from said part to cause said pressure means to urge said frame and clamp into clamping position.

6. A negative holder comprising supporting means having a surface on which a negative may be placed and having an opening therein through which printing light may pass through the negative supported thereon, a frame overlying said supporting means and having clamp means for engagement with the film to urge it against said surface of the supporting means, pivot means between said supporting means and frame and guiding said frame for movement toward and from said surface, pressure means yieldingly urging said frame toward said supporting means to effect clamping of a film lying on said surface, an arm movable with said frame, a pivoted stop lever, a link pivotally connected to said arm and having a lug engageable with one end of said lever, means limiting movement of said lever away from said lug to restrain movement of said clamp means toward said surface, manually controlled means for moving said link and lug away from said stop lever, to move said frame away from said surface and shifting means for moving said stop lever away from said lug to cause said pressure means to move said clamp means into film clamping position.

7. A negative holder comprising supporting means having a surface on which a negative may be placed and having an opening therein through which printing light may pass through the negative supported thereon, a frame overlying said supporting means and having clamp means for engagement with the film to urge it against said surface of the supporting means, pivot means between said supporting means and frame and guiding said frame for movement toward and from said surface, pressure means yieldingly urging said frame toward said supporting means to effect clamping of a film lying on said surface, an arm movable with said frame, a pivoted stop lever, a link pivotally connected to said arm and having a lug engageable with one end of said lever, means limiting movement of said lever away from said lug to restrain movement of said clamp means toward said surface, a pivoted knee lever, an arm moved thereby, means on said arm engaging said link and moving said clamp means away from said surface, and a solenoid having an armature connected to said stop lever and moving said lever away from said lug to cause said pressure means to urge said frame and clamp into clamping position.

8. A negative holder comprising a support having a substantially horizontal top formed with an opening therein through which printing light may pass, means carried by said top and providing a square recess registering with the opening in said support, a square mask received in said recess and having an oblong opening corresponding with the portion of the negative to be printed, a frame overlying said support in spaced relation thereto and having an opening therein registering with the opening in said mask, an upright carried by the support and disposed rearwardly of the opening in the mask, pivot means between said frame and upright having a substantially horizontal axis above the film and supporting said frame for swinging movement toward and from said top, a clamp plate detachably secured to said frame and having an oblong opening therein registering with the opening in said mask, said plate being adapted to be mounted in either of two positions in said frame to cause the opening therein to correspond in direction of extent with the direction of extent of the opening in said mask, and clamping means carried by said frame and engageable with the film to hold the same in printing position.

9. A negative holder comprising a support having a substantially horizontal top formed with an opening therein through which printing light may pass, means carried by said top and providing a recess registering with the opening in said support, a mask received in said recess and having an opening corresponding with the portion of the negative to be printed, a frame having spaced legs and a connecting portion therebetween overlying said support in spaced relation thereto and straddling the opening in said mask, pivot means between said support and frame and supporting said frame for swinging movement toward and from said mask, said legs having upwardly facing surfaces, a clamp plate having marginal portions bearing against said surfaces, and a central portion for engagement with a negative resting on said mask, and spring pressed means carried by said legs and engaging said clamping plate and urging it toward said surfaces and yielding upon engagement of said clamping plate with a film resting on said mask to equalize the pressure throughout the marginal portions of the film.

10. A negative holder comprising a support having a substantially horizontal top formed with an opening therein through which printing light may pass, means carried by said top and providing a recess registering with the opening in said support, a mask received in said recess and having an opening corresponding with the portion of the negative to be printed, a frame having spaced legs and a connecting portion therebetween overlying said support in spaced relation thereto and straddling the opening in said mask, pivot means between said support and frame and supporting said frame for swinging movement toward and from said mask, said legs having parallel facing coplanar slots forming upwardly facing coplanar surfaces, a clamp plate having marginal portions received within said slots with its opposite surfaces movable from said surfaces of the slot to the opposed surfaces of said slots, and spring pressed means carried by said legs and engaging said clamping plate and urging it toward said surfaces and yielding upon engagement of said clamping plate with a film resting on said mask to equalize the pressure throughout the marginal portions of the film.

11. A negative holder comprising a support having a substantially horizontal top formed with an opening therein through which printing light may pass, means carried by said top and providing a recess registering with the opening in said support, a mask received in said recess and having an opening corresponding with the portion of the negative to be printed, a frame having spaced legs and a connecting portion therebetween overlying said support in spaced relation thereto and straddling the opening in said mask, pivot means between said support and frame and supporting said frame for swinging movement toward and from said mask, said legs having parallel facing coplanar slots forming upwardly facing coplanar surfaces, a clamp plate having marginal portions received within said slots with its opposite surfaces movable from said surfaces of the slot to the opposed surfaces of said slots, and spring pressed balls carried by said legs and entering said slots and engaging said clamping plate and urging it toward said surfaces and yielding upon engagement of said clamping plate with a film resting on said mask to equalize the pressure throughout the marginal portions of the film.

12. A negative holder comprising a support having a substantially horizontal top formed with an opening therein through which printing light may pass, means carried by said top and providing a recess registering with the opening in said support, a mask received in said recess and having an opening corresponding with the portion of the negative to be printed, a frame having spaced legs and a connecting portion therebetween overlying said support in spaced relation thereto and straddling the opening in said mask, pivot means between said support and frame and supporting said frame for swinging movement toward and from said mask, said legs having parallel facing coplanar slots forming upwardly facing coplanar surfaces, a clamp plate having marginal portions received within said slots with its opposite surfaces movable from said surfaces of the slot to the opposed surfaces of said slots, and two spring pressed balls each carried by one leg and entering said slots and engaging said clamping plate intermediate two of its opposed edges urging it toward said surfaces and yielding upon engagment of said clamping plate with a film resting on said mask to equalize the pressure throughout the marginal portions of the film.

13. A negative holder comprising a support having a substantially horizontal top formed with an opening therein through which printing light may pass, means carried by said top and providing a recess registering with the opening in said support, a mask received in said recess and having an opening corresponding with the portion of the negative to be printed, a frame having spaced legs and a connecting portion therebetween overlying said support in spaced relation thereto and straddling the opening in said mask, pivot means between said support and frame and supporting said frame for swinging movement toward and from said mask, said legs having parallel facing coplanar slots open at their outward ends and forming upwardly facing coplanar surfaces, a clamp plate having marginal portions insertable endwise into said slots with its opposite surfaces movable from said surfaces of the slot to the opposed surfaces of said slots, and spring pressed means carried by said legs and engaging said clamping plate and urging it toward said surfaces and yielding upon engagement of said clamping plate with a film resting on said mask to equalize the pressure throughout the marginal portions of the film.

References Cited in the file of this patent

UNITED STATES PATENTS

| | | |
|---|---|---|
| 2,248,646 | Small | July 8, 1941 |
| 2,254,125 | Tarullo | Aug. 26, 1941 |
| 2,507,161 | Hughey | May 9, 1950 |

FOREIGN PATENTS

| | | |
|---|---|---|
| 368,012 | Italy | Feb. 7, 1939 |
| 594,530 | Germany | Mar. 1, 1934 |